United States Patent
Burns

(10) Patent No.: US 8,448,973 B2
(45) Date of Patent: May 28, 2013

(54) TRAILER HITCH APPARATUS FOR USE WITH GOOSENECK TRAILERS

(76) Inventor: Danny Burns, Maryville, MO (US)

( * ) Notice: Subject to any disclaimer, the term of this patent is extended or adjusted under 35 U.S.C. 154(b) by 61 days.

(21) Appl. No.: 13/283,451

(22) Filed: Oct. 27, 2011

(65) Prior Publication Data

US 2012/0104728 A1     May 3, 2012

Related U.S. Application Data

(60) Provisional application No. 61/407,283, filed on Oct. 27, 2010.

(51) Int. Cl.
*B60D 1/30*     (2006.01)
(52) U.S. Cl.
USPC .......................... 280/486; 280/504; 280/507
(58) Field of Classification Search
USPC ............. 280/504, 506, 507, 511, 512, 486, 280/425.2, 441.2
See application file for complete search history.

(56) References Cited

U.S. PATENT DOCUMENTS

| | | |
|---|---|---|
| 1,991,684 A | 2/1935 | Holland |
| 2,023,527 A | 12/1935 | Johansen |
| 2,287,516 A | 6/1942 | Endres |
| 2,783,039 A | 2/1957 | Wilson |
| 2,797,934 A | 7/1957 | Helgeson |
| 3,180,454 A | 4/1965 | DeAngelis et al. |
| 3,751,072 A | 8/1973 | Williams |
| 3,843,162 A | 10/1974 | Abromavage et al. |
| 3,863,954 A | 2/1975 | Abromavage et al. |
| 3,868,098 A | 2/1975 | Coombs |
| 3,881,577 A | 5/1975 | Wherry et al. |
| 4,029,307 A | 6/1977 | Nielson |
| 4,191,280 A | 3/1980 | Copperwheat |
| 4,254,966 A | 3/1981 | Mitchell |
| 4,265,465 A | 5/1981 | Deitrich, Sr. |
| 4,718,690 A | 1/1988 | Baker |
| 4,746,138 A | 5/1988 | James |
| 4,773,668 A | 9/1988 | Muonro |
| 4,817,978 A | 4/1989 | James |
| 4,978,133 A | 12/1990 | Thorne et al. |
| 5,050,901 A | 9/1991 | Zhao |
| 5,195,768 A | 3/1993 | Hendrix |
| 5,380,030 A | 1/1995 | Gullickson |
| 5,421,599 A | 6/1995 | Maines |
| 5,823,560 A | 10/1998 | Van Vleet |
| 5,868,415 A | 2/1999 | Van Vleet |

(Continued)

FOREIGN PATENT DOCUMENTS

WO     0071368 A1     11/2000

*Primary Examiner* — Kevin Hurley
*Assistant Examiner* — Michael Stabley
(74) *Attorney, Agent, or Firm* — Lathrop & Gage LLP

(57) ABSTRACT

The apparatus comprises an attachment member for securing the apparatus to a gooseneck trailer. A rectangular housing is secured to the attachment member, and has a front wall, a back wall, and at least one side wall. A cavity is formed by these walls. A ball receiver is pivotably secured internal to the housing and has an opening for the passage of a spring rod. A shock absorbing mechanism is provided, which is secured generally perpendicularly to the housing, and includes at least one spring element. When the ball receiving member pivots towards the front wall, it pushes a bushing disposed on the central rod into the spring element, causing the spring element to compress. When the ball receiving member pivots towards the back wall, it pulls a back plate that causes the spring element to compress.

18 Claims, 14 Drawing Sheets

U.S. PATENT DOCUMENTS

| | | |
|---|---|---|
| 5,915,715 A | 6/1999 | Ford |
| 6,142,500 A | 11/2000 | Sargent |
| 6,250,664 B1 | 6/2001 | Tetrick |
| 6,260,873 B1 | 7/2001 | Bishel et al. |
| 6,286,853 B1 | 9/2001 | Lauzon |
| 6,581,953 B2 | 6/2003 | Jerry |
| 6,834,879 B1 | 12/2004 | Lorman |
| 6,854,757 B2 * | 2/2005 | Rehme .................. 280/488 |
| 7,097,193 B1 * | 8/2006 | Sievert .................. 280/441.2 |
| 7,290,783 B2 | 11/2007 | Dornbos |
| 7,377,536 B2 * | 5/2008 | Rehme .................. 280/483 |
| 7,380,811 B2 * | 6/2008 | Rehme .................. 280/483 |
| 7,775,544 B2 | 8/2010 | Bouwkamp |
| 2008/0023938 A1 | 1/2008 | Dornbos |

* cited by examiner

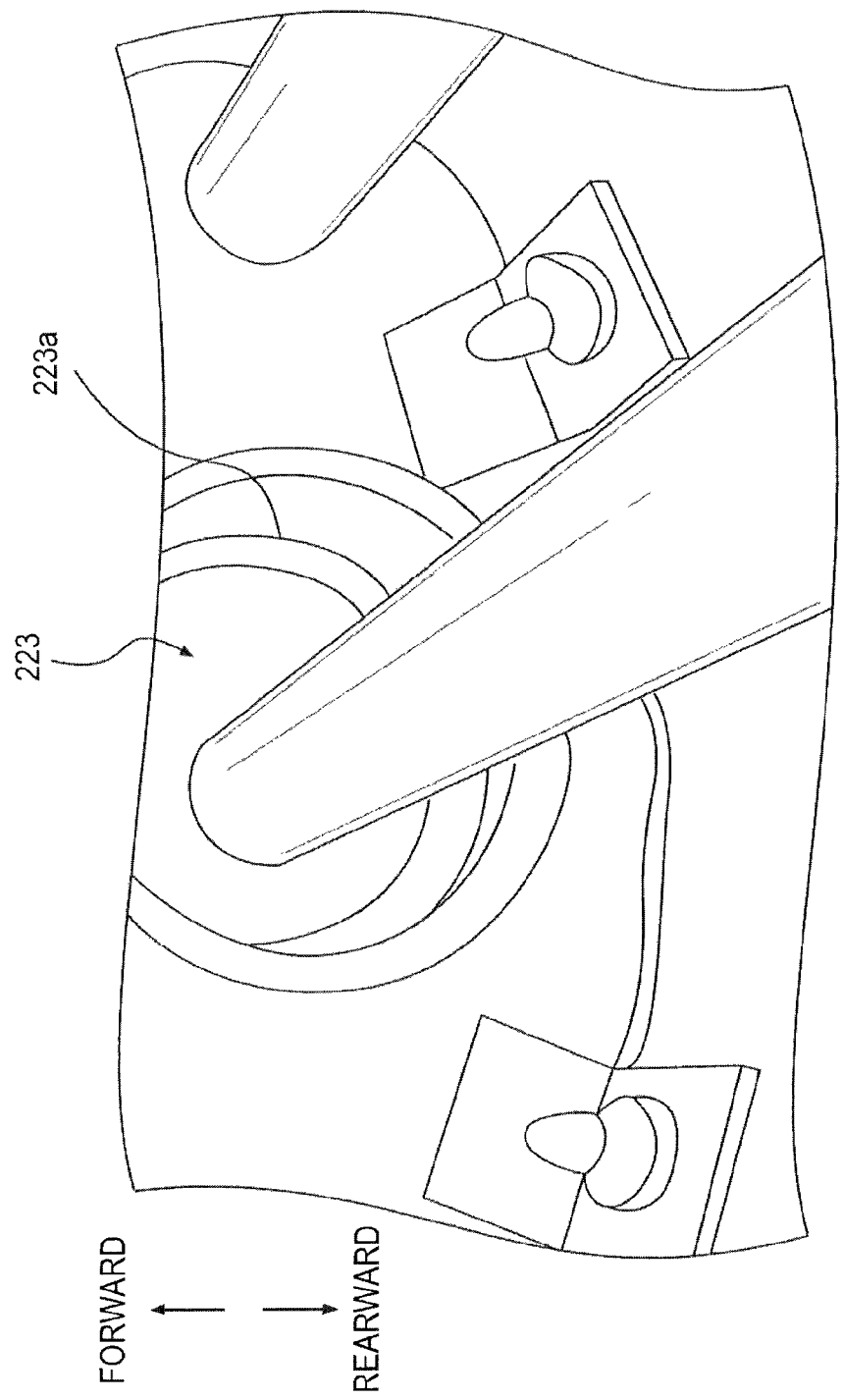

TRAILER HITCH APPARATUS FOR USE WITH GOOSENECK TRAILERS

CROSS-REFERENCE TO RELATED APPLICATIONS

This application claims priority to U.S. Provisional Application No. 61/407,283, filed on Oct. 27, 2010 the disclosure of which is incorporated herein by reference.

BACKGROUND OF THE INVENTION

The invention relates generally to the field of trailer hitches. More specially, the invention relates to a shock-absorbent trailer hitch apparatus for use with gooseneck trailers.

SUMMARY

The invention relates generally to a trailer hitch. According to one embodiment, a hitch apparatus for bi-directional attenuation of shock loading of a towed trailer comprises a connection element for releasably securing the hitch apparatus to a gooseneck trailer, and a housing member with a front wall, two side walls and a back wall. A connection member with an upper end and a lower end, a front surface a back surface and two side surfaces is pivotally secured internal to the housing member at the two connection member side surfaces. The connection member has an opening passing through the connection member from the front surface to the back surface. A shock attenuating unit is secured to and disposed substantially perpendicularly to the housing member. The shock attenuating unit further comprises a rod element with a first end and a second end. The rod element first end passes through a first plate, the housing member front wall and the opening in the connection member and exits through the back surface of the connection member. A spring element with a first end and a second end is disposed longitudinally over the rod element. The spring element first end abuts but does not pass through the housing member front wall. The spring element second end abuts a second plate, and the rod element passes through the second plate and is secured in position by an adjustable locking element. A bushing element is slidably disposed on the rod element between the connection member and the housing member front wall and is of such a diameter that it contacts the first end of the spring element and may also pass unobstructed through the housing member front wall. A locking element is secured to the first end of the rod element and prevents movement of the rod element first end past the connection member back surface. At least one bar element slidably connects the first plate to the second plate and maintains alignment of the rod element and the spring element. When the connection member pivots toward the housing member back wall the locking element secured to the first end of the rod element applies a tensile loading to the rod element which is transferred to the second plate causing the second plate to slidably reposition toward the housing member, thereby causing the spring element to compress. When the connection member pivots toward the housing member front wall the connection member front wall contacts the bushing disposed on the rod element which in turn contacts the spring element and causes the spring element to compress.

According to another embodiment, a trailer hitch apparatus comprise an attachment member for securing the apparatus to a gooseneck trailer. A housing is secured to the attachment member. The housing has a front wall, a back wall, a top wall, a right wall, and a left wall. The front wall has an opening configured for the passage of a central rod therethrough. A shock absorbing mechanism is secured substantially perpendicularly to the front wall. The shock absorbing mechanism includes a front plate, a back plate, a central rod having a first end and a second end, and at least one spring element having a proximal end and a distal end. The at least one spring element is disposed between the front plate and the back plate. The proximal end is adjacent the front plate and the distal end is adjacent the back plate. The front plate is adjacent the front wall of the housing. A first rod extends between and is secured to the right wall and the left wall. A ball receiving member has an elongated portion and a coupling portion. The elongated portion commences adjacent the top wall and has an exposed segment extending beyond the front wall. The elongated portion has a cavity extending through the elongated portion and corresponding to the opening. The central rod first end extends through the opening and the cavity and the central rod second end extends through the back plate. A bushing is slidably disposed on the central rod between the ball receiving member and the housing front wall, and is of such diameter that it contacts the spring element proximal end. The ball receiving member is configured to pivot on the first rod with respect to the front wall and the back wall. When the ball receiving member pivots towards the front wall, it pushes the bushing into the spring proximal end and causes the spring element to compress. When the ball receiving member pivots towards the back wall, it pulls the back plate towards the housing and causes the spring element to compress.

According to yet another embodiment, a hitch apparatus for bi-directional attenuation of shock loading of a towed trailer comprises an attachment member for releasably securing the hitch apparatus to a trailer and a housing with a front wall, two side walls and a back wall. A ball receiving member with an upper end and a lower end, a front surface a back surface and two side surfaces is pivotally secured internal to the housing at the two connection member side surfaces. The connection member has an opening passing through the connection member from the front surface to the back surface. A shock absorbing mechanism is secured to and disposed substantially perpendicularly to the housing. The shock absorbing mechanism further comprises a rod element with a first end and a second end. The rod element first end passes through a first plate, the housing front wall and the opening in the connection member and exits exiting through the back surface of the connection member. A locking element is secured to the first end of the rod element and prevents movement of the rod element first end past the connection member back surface. A spring element with a first end and a second end is disposed longitudinally over the rod element. The spring element first end abuts but does not pass through the housing front wall and the spring element second end abuts a second plate. The rod element passes through the second plate and is secured in position by an adjustable locking element. A bushing element is slidably disposed on the rod element between the connection member and the housing front wall and is of such a diameter that it contacts the first end of the spring element and may also pass unobstructed through the housing front wall. When the connection member pivots toward the housing back wall the locking element secured to the first end of the rod element applies a tensile loading to the rod element which is transferred to the second plate, causing the second plate to slidably reposition toward the housing. This consequently causes the spring element to compress. When the connection member pivots toward the housing front wall the connection member front wall contacts the bushing disposed on the rod element which in turn contacts the spring element and causes the spring element to compress.

BRIEF DESCRIPTION OF THE SEVERAL VIEWS OF THE DRAWINGS

Illustrative embodiments of the present invention are described in detail below with reference to the attached drawing figures, wherein:

FIG. 13 shows a cavity within the housing of the trailer hitch of FIG. 1;

DETAILED DESCRIPTION

Embodiments of the present invention provide systems and methods for dampening vibrations and shocks that are translated from a trailer to a vehicle to which the trailer is secured. More specifically, the present invention discloses a hitch for securing gooseneck trailers to a vehicle and for preventing or at least attenuating the shocks and vibrations that are translated from the gooseneck trailer to the vehicle.

Figure 1:
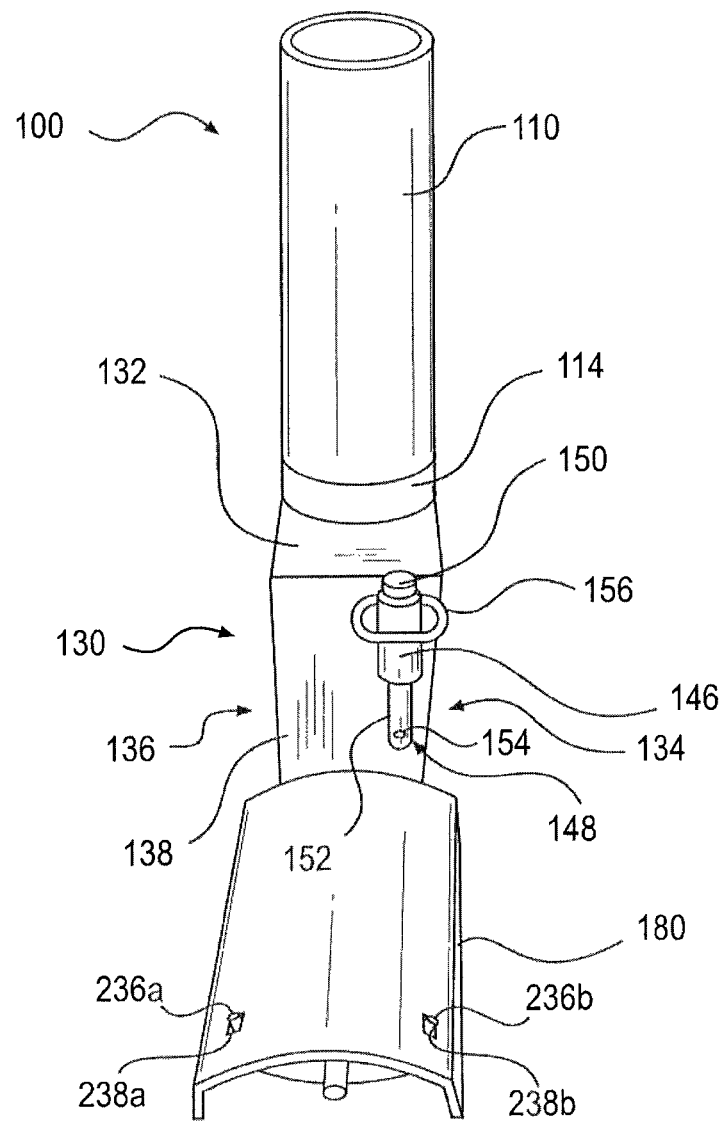
FIG. 1 is a perspective view of a trailer hitch in accordance with the teachings of the current invention.
Figure 6:
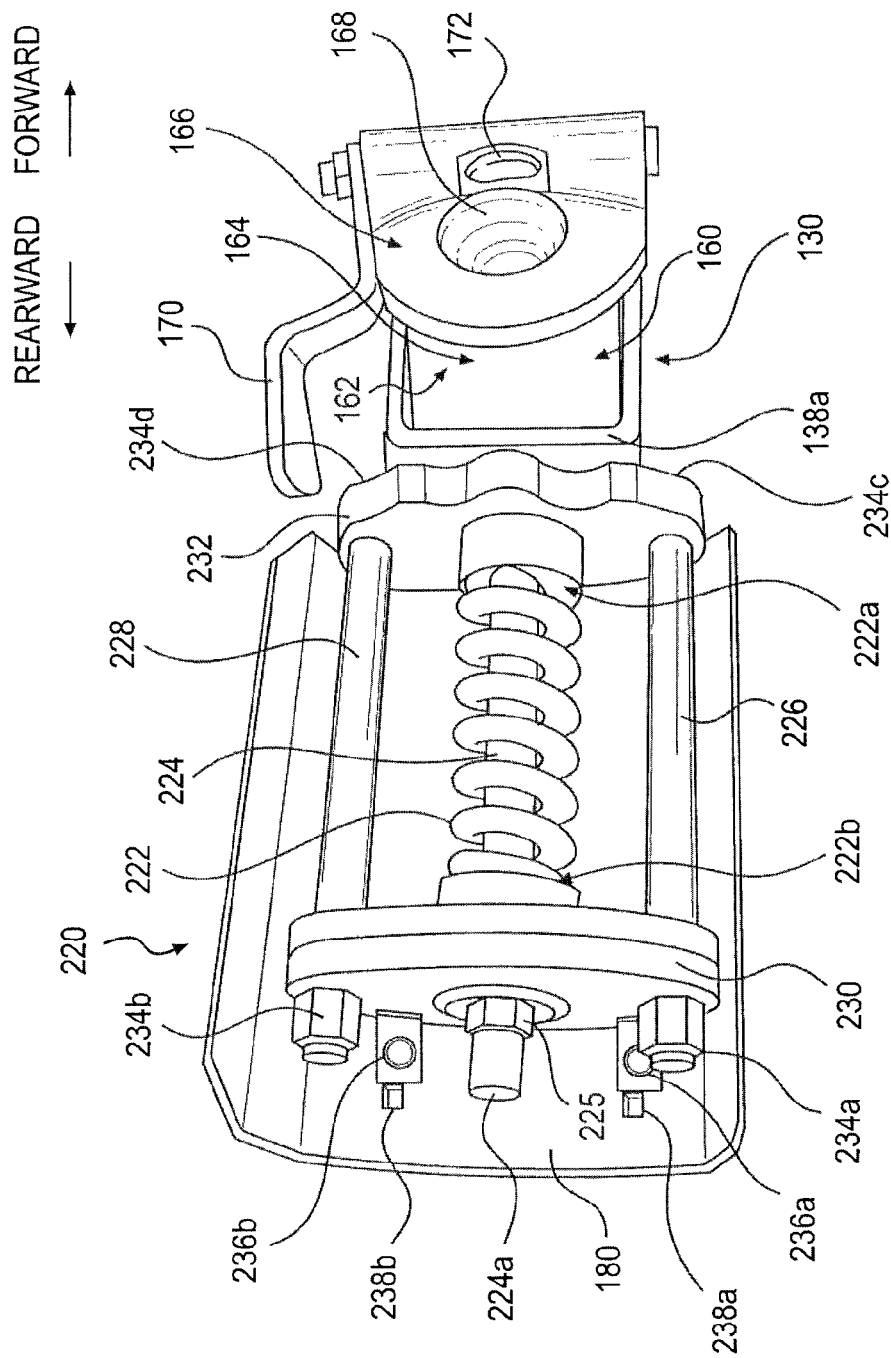
FIG. 6 is a bottom view of the trailer hitch of FIG. 1.

FIG. 1 shows a shock absorbent gooseneck trailer hitch 100 in accordance with the teachings of the current invention. The hitch 100 has an attachment member 110, a housing 130, a pivotable ball receiving member 160 (FIG. 6, FIGS. 14A-C), a protective covering 180, and a shock-absorbing mechanism 220 (FIG. 6).

Figure 8:
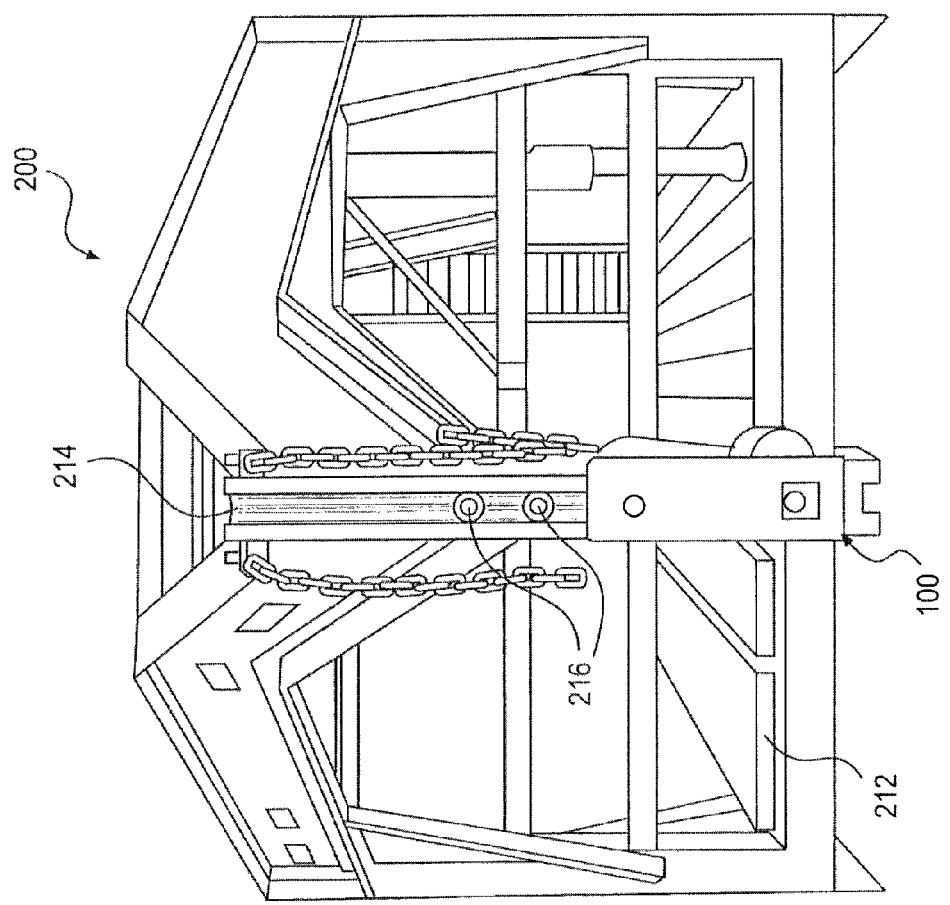
FIG. 8 shows the trailer hitch of FIG. 1 secured to a gooseneck trailer.

Before detailing the hitch 100, it is helpful to first outline a gooseneck trailer 200 (FIG. 8). As compared to bumper pulled trailers, gooseneck trailers 200 are gaining popularity in the industry because of their ability to better distribute the weight of the trailer. In a typical arrangement, the front of the gooseneck trailer 200 projects forward from the main body (for e.g., a trailer bed 212) a set distance, and then a downwardly projecting, hollow, cylindrical trailer coupler 214 is provided for securing the trailer 200 to a vehicle. It is to this trailer coupler 214 to which the hitch 100, and more specifically the attachment member 110 is secured.

Figure 5:
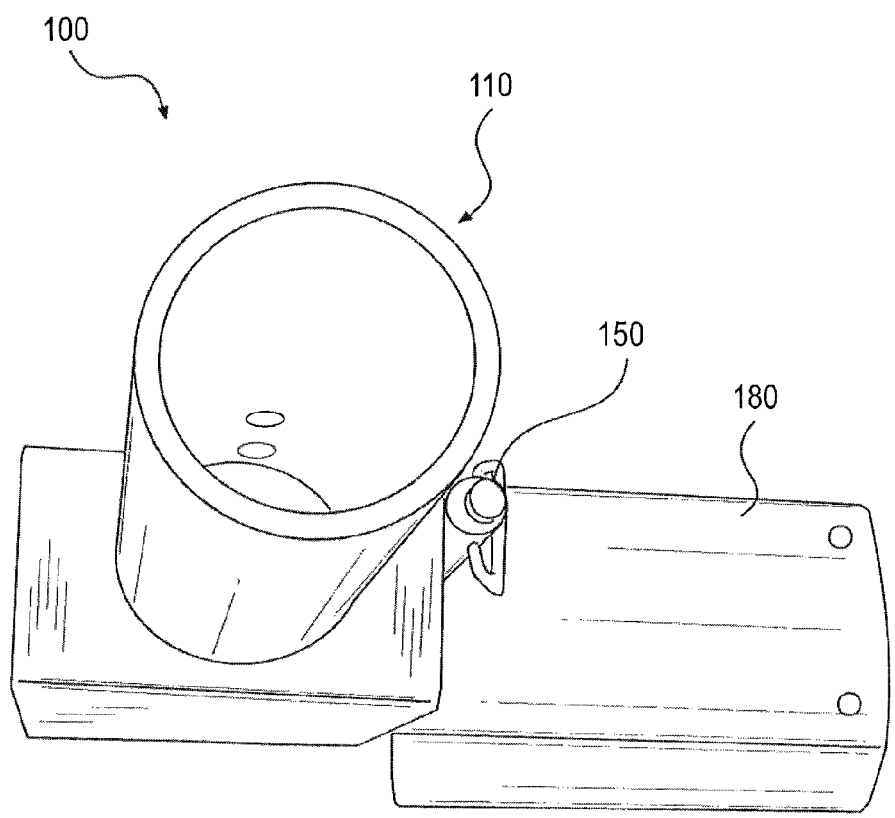
FIG. 5 is a top view of the trailer hitch of FIG. 1.

The attachment member 110 is preferably cylindrical in shape, and is hollow (FIG. 5). The attachment member 110 is inserted into the trailer coupler 214 (see FIG. 8), and can be of varying heights and diameters, so as to ensure that the attachment member 110 properly mates with and fits inside the trailer coupler 214. For example, the attachment member 110 can be between 5 and 30 inches in length, and have a diameter that ranges from 3 to 12 inches.

Figure 2:
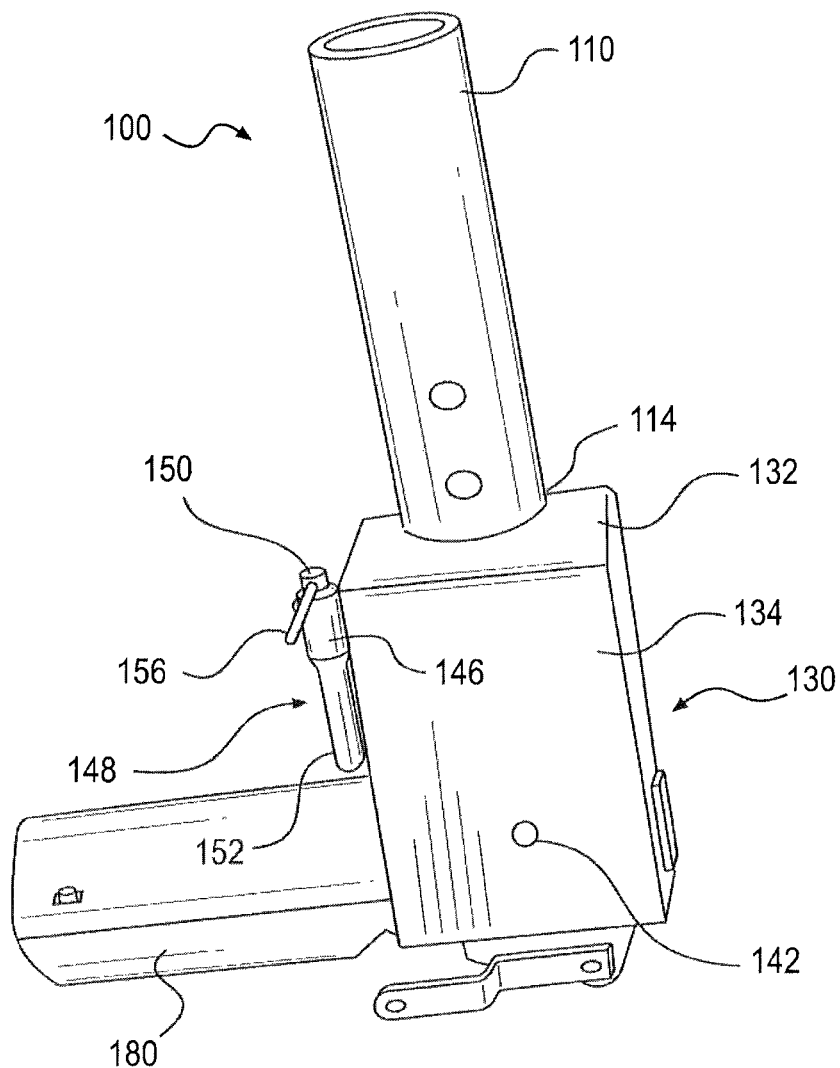
FIG. 2 is a left side view of the trailer hitch of FIG. 1.
Figure 3:
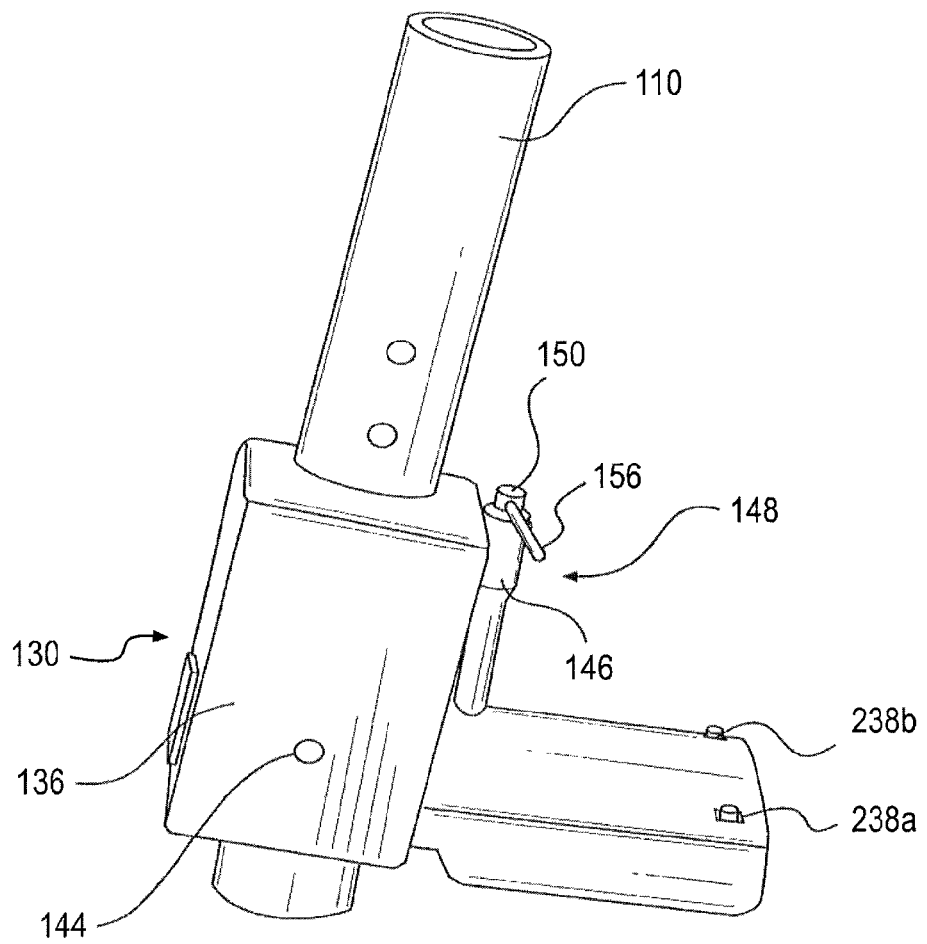
FIG. 3 is a right side view of the trailer hitch of FIG. 1.

A bottom portion 114 of the attachment member 110 is secured to a top wall 132 of the housing 130 (FIG. 1). In the preferred embodiment, the housing 130 is generally in the shape of a rectangular cuboid, and in addition to the top wall 132, has a left wall 134 (see FIG. 2), a right wall 136 (see FIG. 3), a front wall 138 (see FIG. 1), and a back wall 140 (see FIG. 4). The height of the left, right, front and back walls 134, 136, 138, and 140 respectively is generally equal. The left wall 134 of the housing 130 has a cylindrical opening 142, and a corresponding opening 144 is present in the right wall 136 of the housing 130, such that if a locking pin was inserted into the opening 142, the locking pin would come out of the opening 144. The front wall 138 of the housing 130 also has a tube 146 secured thereto, and a locking pin 148 is stored in the tube 146.

The locking pin 148 is generally cylindrical in shape and has a head 150, and a cylindrical portion 152. The length of the cylindrical portion 152 is such that if the cylindrical portion 152 is inserted into the opening 142, it comes out the opening 144 on the opposite side (FIGS. 2-3), and the diameter of the cylindrical portion 152 is such that the locking pin 148 can be conveniently slid in and out of the openings 142, 144. The head 150 has a grip 156 that can be used to insert and withdraw the locking pin 148 from the openings 142, 144, or the tube 146. The grip 156 ensures that the head 150 remains outside the openings 142, 144 when the cylindrical portion 152 is passed through the openings 142, 144; the head 150 may have a larger diameter than the openings 142,144 to ensure the same. A cavity 154 extends through the cylindrical portion 152 towards the bottom, and a cotter pin (not shown) may be inserted through the cavity 154 after the cylindrical portion 152 has been passed through the openings 142, 144. Insertion of the cotter pin into the cavity 154 after insertion of the cylindrical portion 152 through openings 142, 144 prevents the locking pin 148 from inadvertently sliding out of the openings 142, 144. When the locking pin 148 is to be taken out the openings 142, 144 (e.g., for storage in the tube 146), the cotter pin is simply removed from the cavity 154 before the locking pin 148 is pulled out. The cotter pin may be stored alongside the locking pin 148 in the tube 146, or a separate tube may be provided on the hitch 100 for storing the cotter pin.

Figure 7:
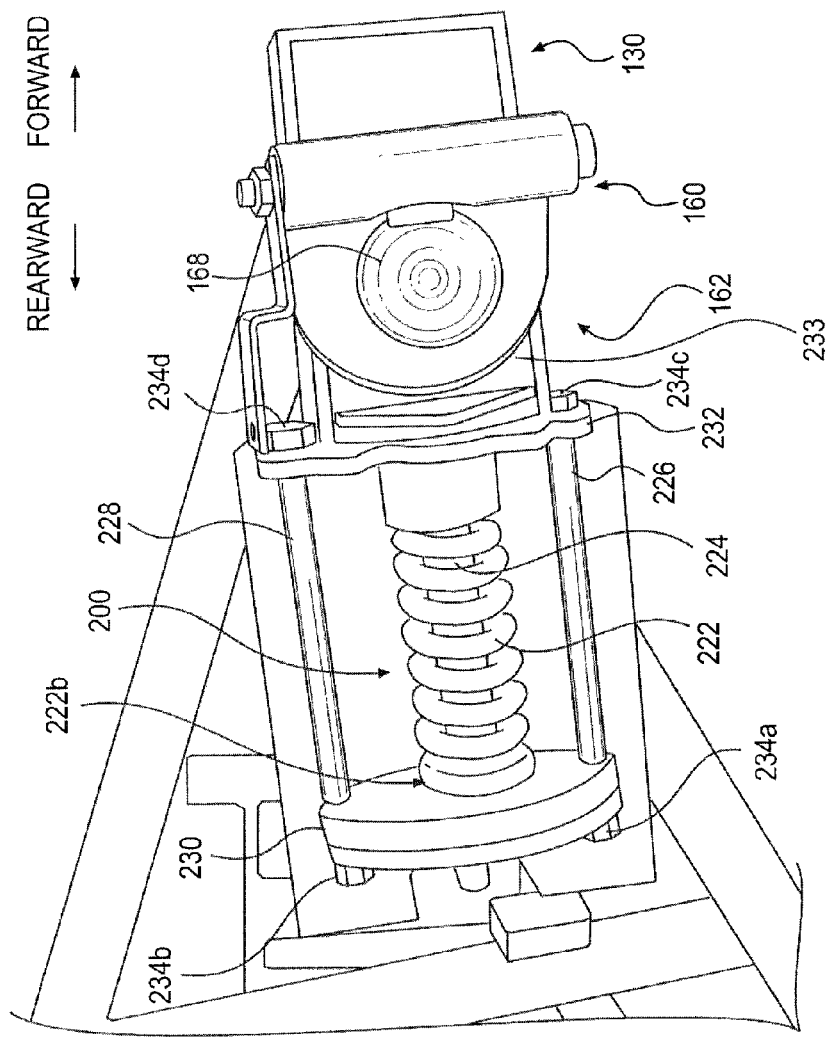
FIG. 7 is another bottom view of the trailer hitch of FIG. 1.

The housing 130 does not have a bottom wall, and is hollow (see FIGS. 6, and 7). Part of the ball receiving member 160 resides within the housing 130. The ball receiving member 160 has an elongated portion 162, which is generally in the shape of a rectangular cuboid. The elongated portion 162 commences near the top wall 132 of the housing 130, and extends down therefrom past the left, right, front, and back walls 134, 136, 138, and 140 of the housing 130. An exposed segment 164 of the elongated portion 162 of the ball receiving member 160 is readily visible when looking at the hitch 100 from the bottom (see FIG. 6). A coupling portion 166 is affixed to the exposed segment 164, and includes a ball coupling cavity 168, a lever 170, and a retracting lock 172 that protrudes from the coupling cavity 168 in its original position.

Figure 9:
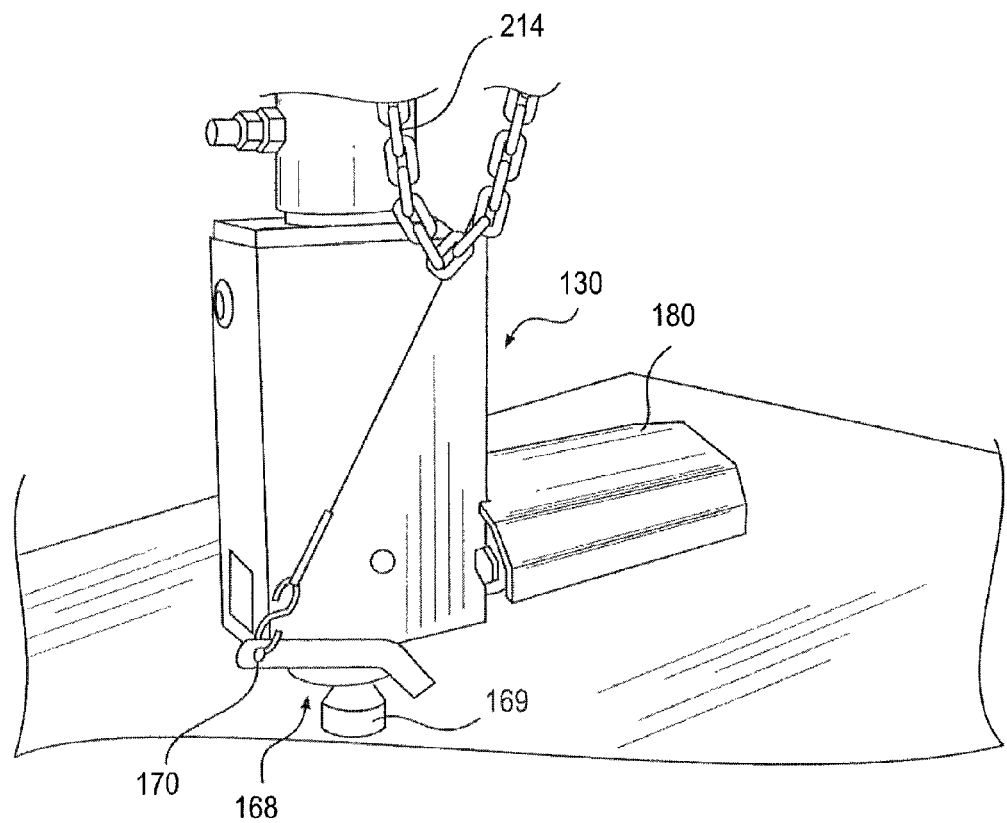
FIG. 9 shows the trailer hitch of FIG. 1 secured to a coupling ball of a vehicle.
Figure 10:
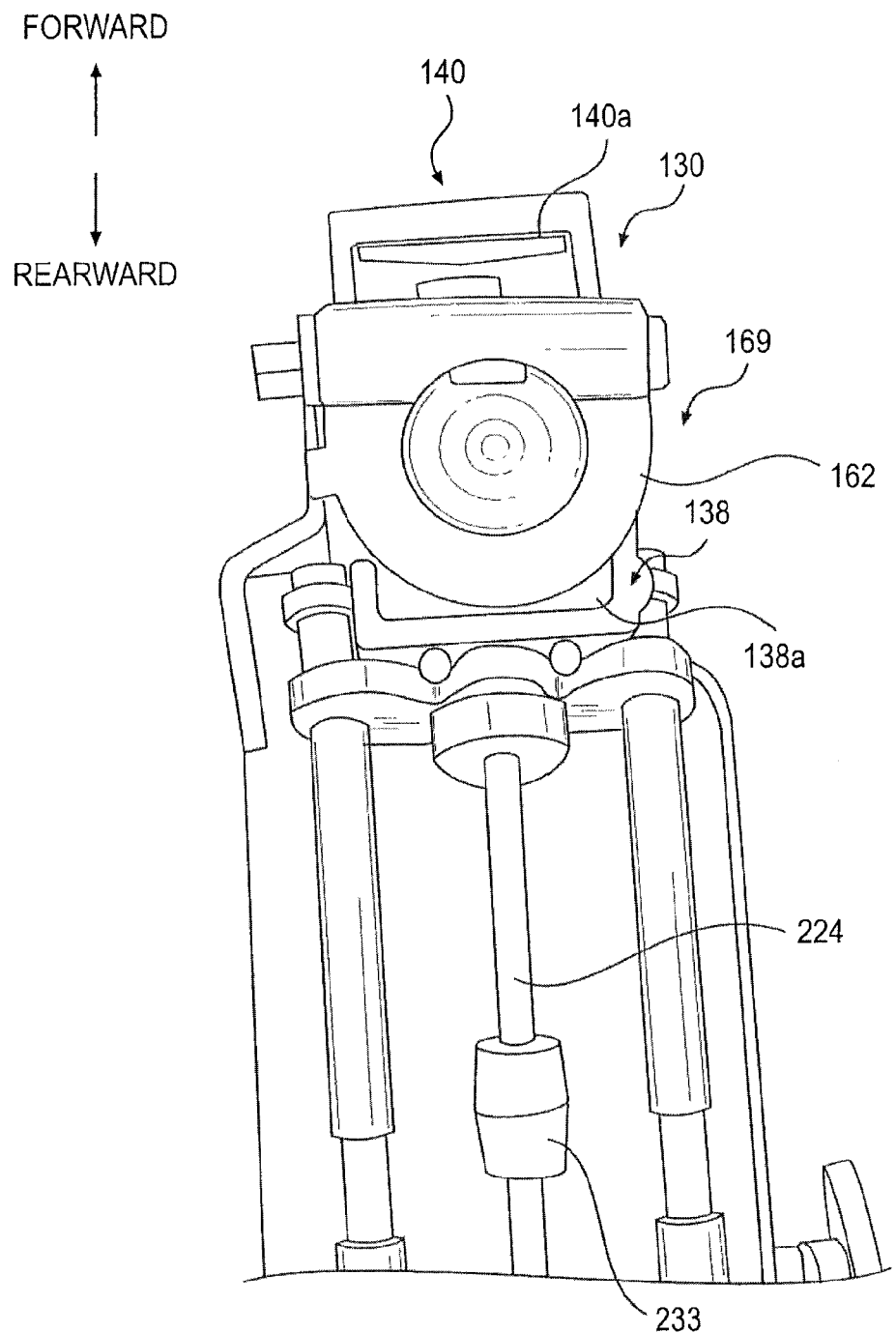
FIG. 10 shows the trailer hitch of FIG. 1 with certain parts removed, and with a ball receiving member that has pivoted in a rearward direction.

It is known to those versed in the art that gooseneck trailers 200 may be secured to a hitch ball 169 (see FIG. 9) on the bed of a towing vehicle, as opposed to the bumper of the towing vehicle. Thus, as shown in FIG. 9, the coupling cavity 168 may enclose at least part of the hitch ball 169 on the bed of a towing vehicle when the hitch 100 is secured to the towing vehicle. The lever 170 is internally connected to the lock 172, such that moving the lever up causes the lock 172 to retract and become generally flush with the coupling cavity 168. Before the coupling cavity 168 is secured to the hitch ball 169, the lever 170 is pushed up to retract the lock 172, and after the coupling cavity 168 is secured to the hitch ball 169, the lever is let go, which causes the lock 172 to return to its original position, i.e., protrude from the coupling cavity 168. The protruding lock 172 ensures that the cavity 168 is fully secured to the hitch ball 169, and the hitch 100 does not unintentionally come off the hitch ball 169 on the bed of the towing vehicle.

Referring back to FIG. 1, the protective covering 180 extends generally perpendicularly from the front wall 138 of the housing 130. Underneath the protective covering 180 lies the shock absorbing mechanism 220, which can be best explained with reference to FIGS. 6-7, and 10-14C. The shock absorbing mechanism 220 includes a helical coil spring 222 having a front end 222a and a back end 222b, a spring rod 224, part of which extends through the spring 222, two external rods 226, 228, back plates 230, front plate 232 and a bushing 233 (see FIG. 10, FIGS. 14A-C) disposed between the ball receiving member 160 and the front end 222a of the spring 222.

In FIGS. 6-7, 10-11, and 14A-C, the shock absorbing mechanism 220 is oriented as if it were in operation; more specifically, according to the compass drawn in FIGS. 6-7, 10-11, and 14A-C, the shock absorbing mechanism 220 is oriented as if a vehicle was towing the gooseneck trailer 200 in the forward direction. To explain the workings of the shock absorbing mechanism 220, when reference is made to directions such as forward or rearward, it will be understood that these references are exemplary only and are used to describe the disclosed apparatus in a typical orientation, but are not independently limiting.

As can be seen from FIGS. 6-7, the spring 222 extends between the front plate 232 and back plates 230. The back end 222b of the spring 222 is capped by the back plates 232 on the rearward side. On the forward side, the front end 222a of the spring 222 is flattened (see FIG. 12).

Figure 4:
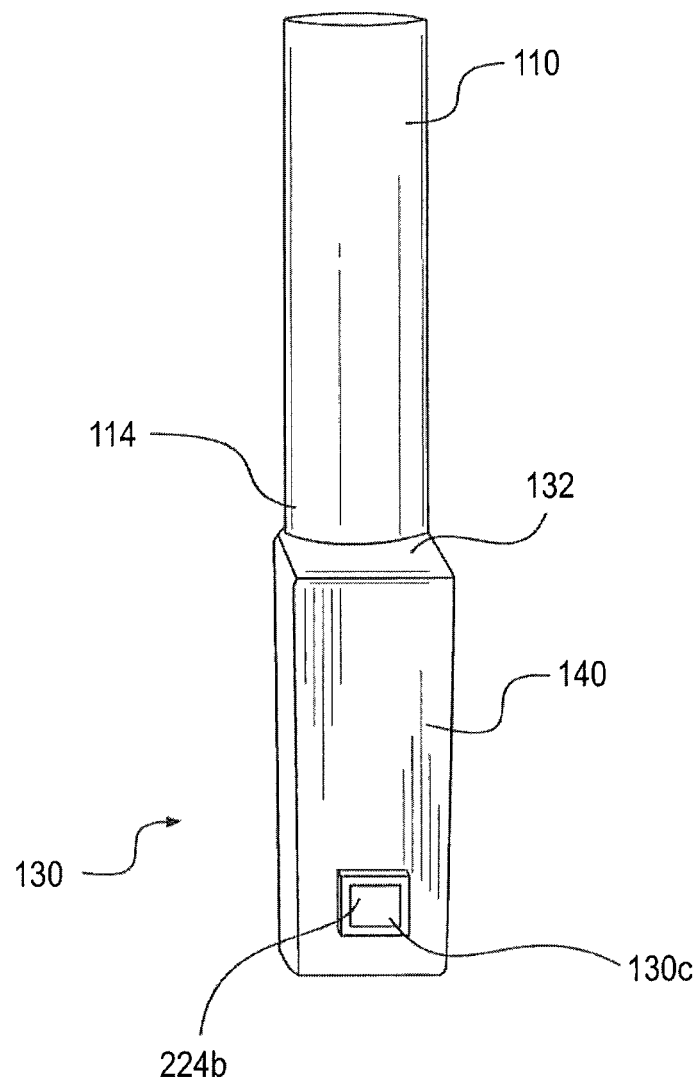
FIG. 4 is a rear view of the trailer hitch of FIG. 1.
Figure 11:
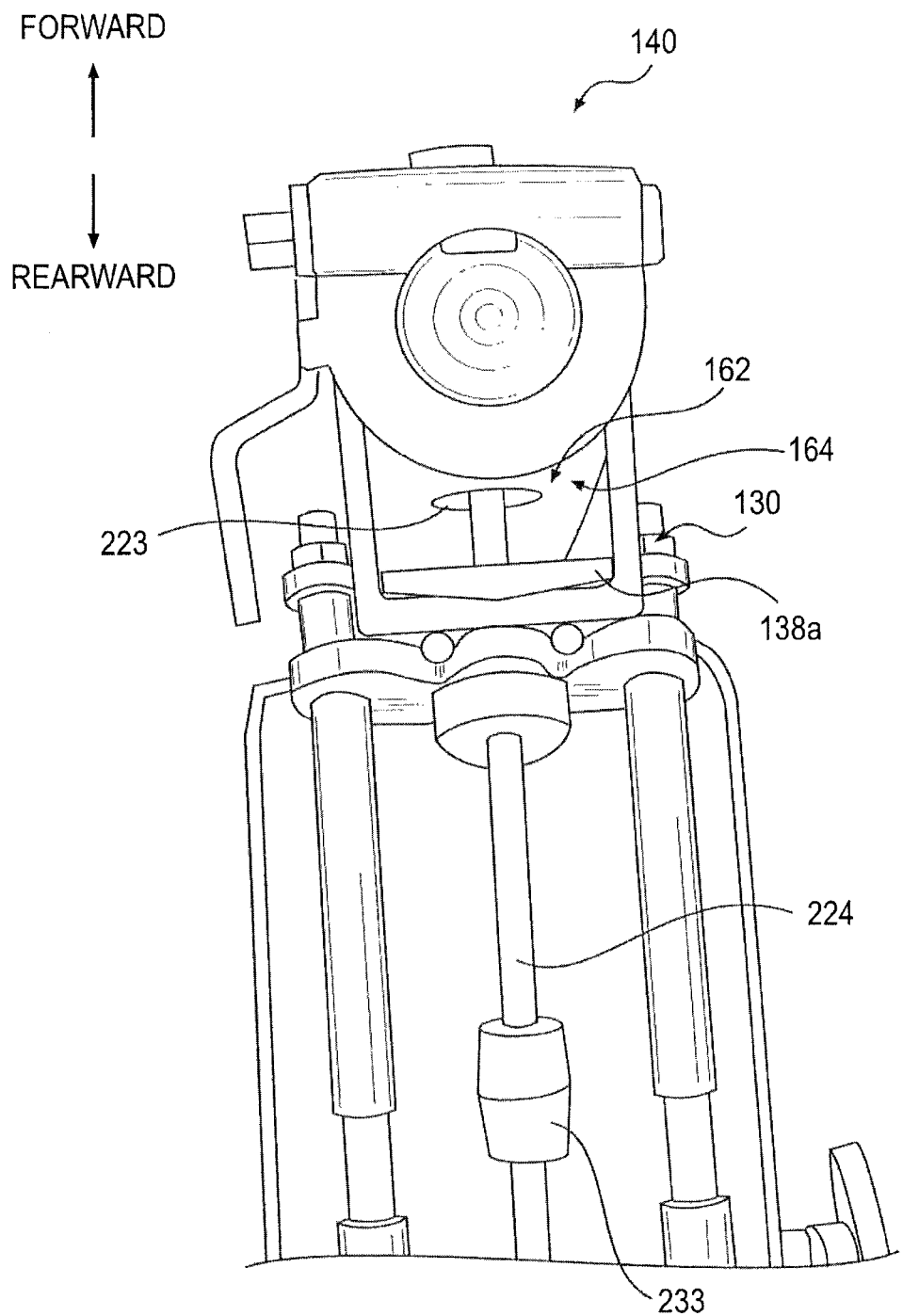
FIG. 11 shows the trailer hitch of FIG. 10 after the ball receiving member has pivoted in a forward direction.
Figure 12:
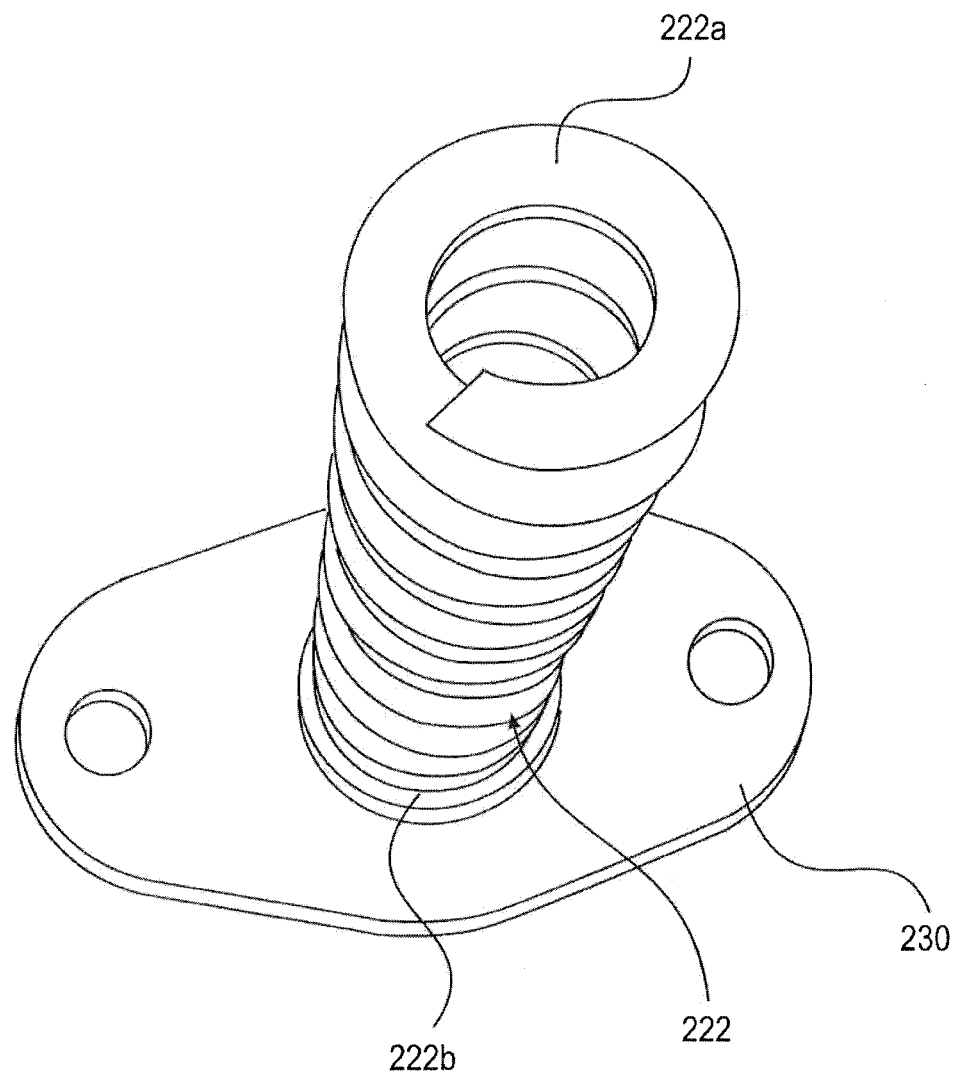
FIG. 12 shows a helical coil spring of the trailer hitch of FIG. 1 disassembled from the hitch.
Figure 14A:
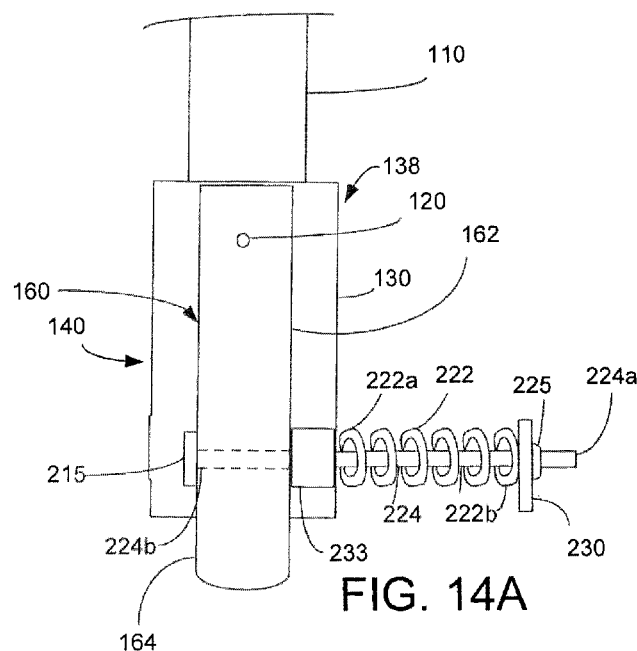
FIG. 14A shows a right side view of the trailer hitch of FIG. 1 with certain parts removed.

A cavity 223 (see FIG. 13) extends from the front plate 230/housing front wall 138 on the rearward side through the elongated portion 162 of the ball receiving member 160, such that when the spring rod 224 is passed through this cavity 223, the spring rod 224 passes through the elongated portion 162 on the forward side; the back wall 140 of housing 130 has a cavity 130c which corresponds to and is adjacent the cavity 223 (see FIG. 4). Thus, on the forward side, the spring rod 224 passes through the cavity 223 within the elongated portion 162 of the ball receiving member 160, and terminates at an end 224b adjacent the back wall 140 of the housing (FIGS. 11, 14A). The cavity 223 may be circular, oblong, or of other shapes. On the rearward side, the spring rod 224 extends through the coils of the spring 222, past the back end 222b of the spring 222, the back plates 230, and terminates at an end 224a (see FIG. 6, FIG. 14A). A lock or nut 215 (see FIG. 14A) secures the spring rod 224 to the elongated portion 162 of the ball receiving member 160 on the forward side, and a lock or nut 225 (see FIGS. 6, 14A) secures the spring rod 224 to the back plates 230 on the rearward side.

Figures 14B, 14C:
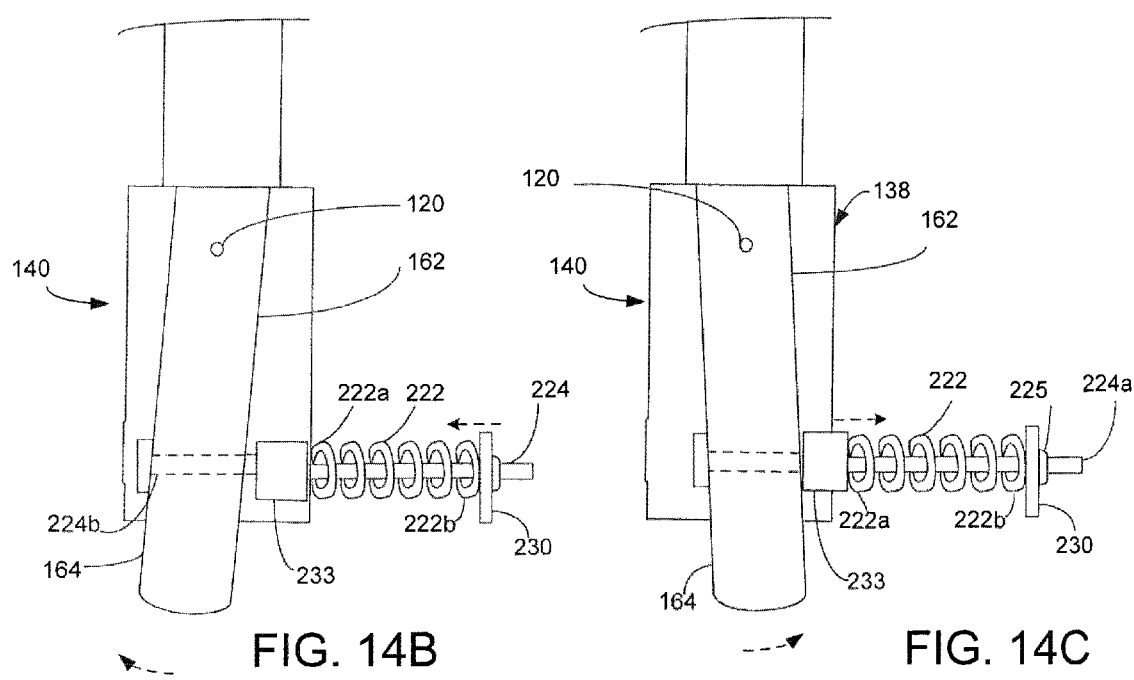
FIGS. 14B and 14C show right side views of the trailer hitch of FIG. 14A as a vehicle to which the hitch is secured brakes and accelerates, respectively.

The ball receiving member 160 is configured to selectively pivot at a pivot point 120 (see FIGS. 14A-C); more specifically, a rod 227 (not shown) is secured (e.g., by welding or locks) to the inside of the left wall 134 of the housing 130, passed through an opening 120o (not shown) in the elongated portion 162, and secured to the inside of right wall 136 of the housing 130. The ball receiving member 160 rests on and pivots forward and rearward within the housing 130 on this rod 227 at the pivot point 120 (see FIGS. 14A-C). Hence, as shown in FIGS. 11 and 14B, the exposed segment 164 of the elongated portion 162 of the ball receiving member 160 is adjacent the rear wall 140 of the housing, whereas in FIGS. 10 and 14C, the exposed segment 164 is adjacent the front wall 138 of the housing 130. The front and back walls 138, 140 of the housing 130 may have cushioning elements 138a and 140a respectively (FIGS. 10, 11), which may be made of plastic or other suitable material, and avoid metal on metal contact by preventing the elongated portion 162 from directly striking the front and back walls 138, 140 respectively of the housing 130.

On the rearward side, the cavity 223 has a lip 223a (see FIG. 13). The diameter of this lip 223a corresponds to the flattened spring front end 222a, such that the lip 223a stops the spring front end 222a from extending forward past the lip 223a. The bushing 233, on the other hand, has a smaller diameter than the lip 223a, and can be pushed by the elongated portion 162 into the front end 222a of the spring 222.

External rods 226, 228 extend between the front and back plates 232, 230 respectively. The external rods 226, 228 are bolted to the back plates 230 with bolts 234a, 234b, and to front plate 232 with bolts 234c and 234d respectively. The spring rod 224 and the external rods 226, 228 are rigid (i.e., not flexible). As such, by virtue of the rigid external rods 226, 228 being bolted to the plates 230, 232, the back plates 232 cannot move in the rearward direction past their initial position. The back plates 232, however, may move in the forward direction to a limited extent—more specifically, the back plates 232 are secured to the protective covering 180 via locks 236a, 236b, which extend through openings 238a, 238b in the protective covering (FIG. 1, FIG. 6) and allow for limited movement of the back plates 232.

When the ball receiving member 160 pivots forward (i.e., towards the rear wall 140 of the housing 130, as in FIGS. 6, 11, and 14B), it pushes the lock 215 in the forward direction, which causes the end 224b of spring rod 224 to also move in the forward direction. As the spring rod 224 is secured to the back plates 230, when the spring rod 224 is pushed in the forward direction by the ball receiving member 160, the back plates 230 are pulled in the forward direction along with the external rods 226, 228. The back plates 230 in-turn push the back end 222b of the spring 222 in the forward direction. The front end 222a of the spring, however, is prevented from moving in the forward direction because of the lip 223a. Thus, when the ball receiving member 160 pivots in the forward direction, the spring 222 contracts, i.e., the back end 222b of the spring 222 is pushed closer to the front end 222a of the spring 222.

When the ball receiving member 160 pivots rearward (i.e., towards the front wall 138 of the housing 130, as in FIGS. 7, 10, and 14C), it pushes the bushing 233 rearward, which in-turn pushes the front end 222a of the spring 222 rearward. The back end 222b of the spring 222, however, is constrained from moving rearward because of the rigid external rods 226, 228 and back plates 230. Therefore, when the ball receiving member 160 pivots rearward, the spring 222 again contracts, but in this situation, the front end 222a of the spring 222 is pushed closer to the back end 222b.

Consider now that the vehicle towing the trailer 200 with a heavy load is moving forward at a certain speed, for example, 50 miles/hour, but has to suddenly brake because of oncoming traffic. It is well known that under the laws of physics, while the vehicle will stop abruptly because of the application of the brakes, the trailer 200, on account of its weight and the weight of the heavy load, will want to continue to move in the forward direction because of momentum. With conventional gooseneck trailer hitches, these opposing tendencies of the vehicle and the trailer cause shocks/vibrations, which shocks are transferred from the trailer coupler 214 to the vehicle. The driver and/or passenger(s) of the towing vehicle, thus, have to endure such shocks every time the vehicle suddenly brakes. In accordance with the teachings of the present invention, however, the shock will be, for the most part, absorbed by the shock absorbing mechanism 220. More specifically, as the vehicle brakes, the trailer 200 will have the tendency to continue to move in the forward direction, along with the ball receiving member 160. This tendency may cause the ball receiving member 160 to pivot in the forward direction (i.e., towards the rear wall 140 of the housing, as in FIGS. 6, 11, and 14B) at pivot point 120, such that the elongated portion 162 comes closer to, or even contacts the cushioning elements 140a. As the ball receiving member 160 pivots forward, as discussed, it pushes the spring rod 222 forward, which consequently pulls the back plates 230 and the external rods 226, 228 in the forward direction. The back end 222b of the spring 222, hence, will be pushed by the back plates 230 towards the front end 222a of the spring 222, which front end 222a is prevented from moving forward because of the lip 223a. The spring 222 will thus contract. As is known, force is required to cause a spring to contract. A significant portion of the force/vibrations created from the sudden braking of the vehicle, thus, instead of being translated directly from the trailer 200 to the vehicle, will be expended in contracting the spring 222, and the shock/force ultimately translated to the vehicle will be significantly attenuated.

Similarly, when the vehicle accelerates rapidly in the forward direction (for example, from rest), the trailer 200 has the tendency to remain in its position due to its heavy load instead of moving along abruptly with the vehicle, and these opposing tendencies of the vehicle and the trailer 200 cause a shock to be transferred from the trailer 200 to the vehicle. The shock absorbing mechanism 220 disclosed herein absorbs much of this shock. More specifically, as the vehicle accelerates in the forward direction, it takes along with it the attachment member 110 and the housing 130. The ball receiving member 160, however, because of its tendency to remain at rest, pivots rearward towards the front wall 138 of the housing 130 (as in FIGS. 7, 10, and 14C), and comes adjacent or contacts the cushioning element 138a. As the ball receiving member 160 pivots rearward, it pushes the bushing 233 rearward along the spring rod 224, which in turn pushes the spring front end 222a rearward (see FIG. 14C). The back end 222b of the spring 222, as discussed previously, is unable to move rearward because of the external rods 226, 228 and the back plates 230. Thus, the spring 222 contracts, i.e., the front end 222a of the spring 222 moves closer to the back end 222b of the spring 222. Force is required to contract the spring 222, and consequently, much of the force generated from the sudden acceleration, instead of being translated directly from the trailer 200 to the vehicle, is expended in contracting the spring 222. The shock/force ultimately translated to the vehicle therefore is significantly attenuated.

It is well known that when a spring is compressed or stretched, the force exerted is proportional to the spring's change in length, and as such, the rate or spring constant of a spring has the units of force divided by distance. In accordance with the present invention, springs 222 of varying constants may be used in the shock absorbing mechanism 220 depending on the weight of the load carried by the trailer 200; for example, for heavier loads, springs with spring constants of 2,000 lbf/in may be used, whereas springs with constants of 1,600 lbf/in may be used for lighter loads. Additionally, the lock 215 (FIG. 14A) may be adjusted (e.g., by tightening) to regulate the response of the shock absorbing mechanism 220 to varying loads.

It is also understood by those versed in the art that a majority of the disruptive forces reaching the vehicle from the trailer, on account of gravity and the heavy load of the vehicle, will be in the horizontal direction as opposed to the vertical direction. As disclosed herein, the gooseneck trailer hitch 100, while connected vertically to the vehicle, can attenuate the undesired horizontal impact forces transferred to the vehicle. For example, when the trailer 200 goes into a pothole, a series of shock loadings occur that may cause the trailer 200 to accelerate or decelerate, but, the shock absorbing mechanism 220 attenuates these loads, thereby reducing the fatigue loading on all structural elements, including the hitch ball 169. As such, the hitch 100 disclosed herein improves the overall safety of the towing process. Uniquely, the spring 222 only contracts to absorb these forces, irrespective of whether the undesirable forces re being applied from the forward or the rearward direction.

It is also possible to nullify the effects of the shock absorbing mechanism 220, such that the hitch 100 functions akin to conventional gooseneck hitches. To ensure that the impact loads are not transferred from the ball receiving member 160 to the shock absorbing mechanism 220, the locking pin 148 is simply inserted into the openings 142, 144 (FIGS. 2-3) and as discussed, locked in place by passing the cotter pin through the cavity 154 in the cylindrical portion 152 of the locking pin 148. The locking pin 148 locks the ball receiving member 160 firmly in place and prevents it from pivoting. The impact loads, thus, are translated straight from the trailer coupler 214 to the vehicle. Since the locking pin 148 ensures that the shock absorbing mechanism 220, including the spring 222, spring rod 224 and external rods 226, 228 do not come into play, the locking pin 148 provides for a safety feature on the hitch 100, and can be used whenever any element of the shock absorbing mechanism 220 is out of order. The locking pin 148 may also be used to demonstrate the effectiveness of the hitch 100 to potential customers, for example, by taking customers along the same bumpy route both with and without the ball receiving member 160 being locked by the locking pin 148.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

The invention claimed is:

1. A hitch apparatus for bi-directional attenuation of shock loading of a towed trailer, the apparatus comprising:
   a connection element for releasably securing the hitch apparatus to a gooseneck trailer;
   a housing member with a front wall, two side walls and a back wall;
   a connection member with an upper end and a lower end, a front surface a back surface and two side surfaces, the connection member being pivotally secured internal to the housing member at the two connection member side surfaces, the connection member having an opening passing through the connection member from the front surface to the back surface;

a shock attenuating unit secured to and disposed substantially perpendicularly to the housing member, the shock attenuating unit further comprising;

a rod element with a first end and a second end, the rod element first end passing through a first plate, the housing member front wall and the opening in the connection member exiting through the back surface of the connection member;

a spring element with a first end and a second end that is disposed longitudinally over the rod element wherein the spring element first end abuts but does not pass through the housing member front wall and the spring element second end abuts a second plate, wherein the rod element passes through the second plate and is secured in position by an adjustable locking element;

a bushing element slidably disposed on the rod element between the connection member and the housing member front wall and of such a diameter that it contacts the first end of the spring element and may also pass unobstructed through the housing member front wall;

a locking element secured to the first end of the rod element preventing movement of the rod element first end past the connection member back surface;

at least one bar element slidably connecting the first plate to the second plate and maintaining alignment of the rod element and the spring element;

wherein when the connection member pivots toward the housing member back wall the locking element secured to the first end of the rod element applies a tensile loading to the rod element which is transferred to the second plate causing the second plate to slidably reposition toward the housing member causing the spring element to compress, wherein when the connection member pivots toward the housing member front wall the connection member front wall contacts the bushing disposed on the rod element which in turn contacts the spring element causing the spring element to compress.

2. The hitch apparatus of claim 1, wherein a first cushioning element is secured to the front wall of the housing member, and a second cushioning element is secured to the back wall of the housing member.

3. The hitch apparatus of claim 2, wherein the at least one bar element comprises a first bar element and a second bar element, the rod element being disposed between the first bar element and the second bar element.

4. The hitch apparatus of claim 1, wherein the lower end of the connection member includes a coupling portion for securing the hitch apparatus to a hitch ball of a towing vehicle.

5. The hitch apparatus of claim 4, wherein the coupling portion includes a retractable lock.

6. The hitch apparatus of claim 5, wherein the spring element has a spring constant between about 1,600 lbf and 2,000 lbf.

7. The hitch apparatus of claim 1, further comprising a locking pin secured to the housing member.

8. The hitch apparatus of claim 7, wherein:
the two side walls of the housing member each have a hole;
a cavity extends through the two side surfaces of the connection member;
wherein the hole in each of the two side walls of the housing member correspond to the cavity extending through the two side surfaces of the connection member; and
wherein the connection member can be locked into position by insertion of the locking pin through the hole in each of the two sidewalls and the cavity.

9. A trailer hitch apparatus comprising:
a. an attachment member for securing the apparatus to a gooseneck trailer;
b. a housing secured to the attachment member, the housing having a front wall, a back wall, a top wall, a right wall, and a left wall, the front wall having an opening configured for the passage of a central rod therethrough;
c. a shock absorbing mechanism secured substantially perpendicularly to the front wall, the shock absorbing mechanism including a front plate, a back plate, a central rod having a first end and a second end, and at least one spring element having a proximal end and a distal end, the at least one spring element disposed between the front plate and the back plate, the proximal end being adjacent the front plate and the distal end being adjacent the back plate, the front plate being adjacent the front wall of the housing;
d. a first rod extending between and secured to the right wall and the left wall;
e. a ball receiving member, the ball receiving member having an elongated portion and a coupling portion, the elongated portion commencing adjacent the top wall and having an exposed segment extending beyond the front wall, the elongated portion having a cavity extending through the elongated portion and corresponding to the opening, the central rod first end extending through the opening and the cavity and the central rod second end extending through the back plate;
f. a bushing slidably disposed on the central rod between the ball receiving member and the housing front wall, the bushing being of such diameter that it contacts the spring element proximal end;
wherein the ball receiving member is configured to pivot on the first rod with respect to the front wall and the back wall; and
wherein when the ball receiving member pivots towards the front wall, it pushes the bushing into the spring proximal end and causes the spring element to compress, and wherein when the ball receiving member pivots towards the back wall, it pulls the back plate towards the housing and causes the spring element to compress.

10. The trailer hitch apparatus of claim 9, wherein the coupling portion includes a retractable lock.

11. The trailer hitch apparatus of claim 10, wherein the shock absorbing mechanism further comprises a first external rod and a second external rod, the central rod being disposed therebetween.

12. The trailer hitch apparatus of claim 11, wherein a first cushioning element is secured to the housing front wall and a second cushioning element is secured to the housing back wall.

13. The trailer hitch apparatus of claim 12, wherein the elongated portion is generally cylindrical.

14. The trailer hitch apparatus of claim 12, further comprising a locking pin secured to the housing.

15. The trailer hitch apparatus of claim 14, wherein:
the right wall has a first hole, the left wall has a second hole, and a first cavity extends through the elongated portion, the first and the second holes corresponding to the first cavity and configured for insertion of the locking pin therethrough;
wherein insertion of the locking pin through the first and the second holes and the cavity locks the ball receiving member in position and prevents it from pivoting.

16. The trailer hitch apparatus of claim 15, wherein the locking pin is configured for the insertion of a cotter pin.

17. A hitch apparatus for bi-directional attenuation of shock loading of a towed trailer, the apparatus comprising:
- an attachment member for releasably securing the hitch apparatus to a trailer;
- a housing with a front wall, two side walls and a back wall;
- a ball receiving member with an upper end and a lower end, a front surface a back surface and two side surfaces, the connection member being pivotally secured internal to the housing at the two connection member side surfaces, the connection member having an opening passing through the connection member from the front surface to the back surface;
- a shock absorbing mechanism secured to and disposed substantially perpendicularly to the housing, the shock absorbing mechanism further comprising;
  - a rod element with a first end and a second end, the rod element first end passing through a first plate, the housing front wall and the opening in the connection member exiting through the back surface of the connection member, a locking element secured to the first end of the rod element preventing movement of the rod element first end past the connection member back surface;
  - a spring element with a first end and a second end that is disposed longitudinally over the rod element wherein the spring element first end abuts but does not pass through the housing front wall and the spring element second end abuts a second plate, wherein the rod element passes through the second plate and is secured in position by an adjustable locking element;
  - a bushing element slidably disposed on the rod element between the connection member and the housing front wall and of such a diameter that it contacts the first end of the spring element and may also pass unobstructed through the housing front wall;
- wherein when the connection member pivots toward the housing back wall the locking element secured to the first end of the rod element applies a tensile loading to the rod element which is transferred to the second plate causing the second plate to slidably reposition toward the housing causing the spring element to compress, wherein when the connection member pivots toward the housing front wall the connection member front wall contacts the bushing disposed on the rod element which in turn contacts the spring element causing the spring element to compress.

18. The apparatus of claim 17, wherein the trailer is a gooseneck trailer.

\* \* \* \* \*